(12) United States Patent
Greene et al.

(10) Patent No.: US 7,342,370 B2
(45) Date of Patent: Mar. 11, 2008

(54) ELECTRONIC CONTROL SYSTEM WITH TORQUE AND/OR SPEED BOOST FOR MOTOR VEHICLE SEATS

(75) Inventors: Darrell Frederick Greene, Huntsville (CA); James William Herbert Mondry, Hamilton (CA); David J. Parent, Coldwater (CA); Charles Lee Flynn, Davisburg, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 11/370,266

(22) Filed: Mar. 7, 2006

(65) Prior Publication Data

US 2006/0220600 A1 Oct. 5, 2006

Related U.S. Application Data

(60) Provisional application No. 60/659,589, filed on Mar. 8, 2005.

(51) Int. Cl.
*H02P 7/00* (2006.01)

(52) U.S. Cl. .................. 318/432; 318/139; 318/433; 318/434

(58) Field of Classification Search ................ 318/432, 318/3, 139, 433, 434, 443, 444, 445, 446, 318/478; 360/68, 66, 61; 701/45; 180/271; 358/806
See application file for complete search history.

(56) References Cited

U.S. PATENT DOCUMENTS

| | | | |
|---|---|---|---|
| 6,831,800 B2* | 12/2004 | Ranmuthu | .................. 360/68 |
| 2005/0131606 A1* | 6/2005 | Motozawa et al. | ........... 701/45 |

* cited by examiner

*Primary Examiner*—Karen Masih
(74) *Attorney, Agent, or Firm*—Richard M. Mescher; Porter Wright Morris & Arthur; Dean B. Watson

(57) ABSTRACT

A motor vehicle seat adjuster includes a DC motor and a control system operably connected to the motor to control seat motion to a desired motion profile. Power to the motor is variable from less than 100% of normal power to greater than 100% of normal power. The desired motion profile preferably includes a normal operating power and a boost operating power and the control system automatically increases motor power to the boost operating power after one of a predetermined period of time, a predetermined distance of travel, or a predetermined sensed condition. Parameters of the motion profile are preferably customizable.

38 Claims, 17 Drawing Sheets

SPEED OF OPERATIONS FOR POWER SEAT

| | AMB Normal (w/o boost) | AMB Boosted | -30C Normal (w/o boost) | -30C Boosted | +80C Normal (w/o boost) | +80C Boosted | units |
|---|---|---|---|---|---|---|---|
| Hz Travel | 245 | 245 | 245 | 245 | 245 | 245 | mm |
| Forward Current Draw | 5.319 | 5.066 | 10.1 | 10.48 | 4.488 | 5.51 | A |
| Time for motion | 19.9 | 12.2 | 37.8 | 29.4 | 16.3 | 8.4 | s |
| Speed | 12.31 | 20.08 | 6.48 | 8.33 | 15.03 | 29.17 | mm/s |
| Rearward Current Draw | 3.886 | 3.88 | 7.202 | 8.5 | 3.278 | 3.837 | A |
| Time for motion | 17.1 | 10.6 | 25.2 | 22.9 | 14.9 | 8 | s |
| Speed | 14.33 | 23.11 | 9.72 | 10.70 | 16.44 | 30.63 | mm/s |
| Front Vert Travel | 18 | 18 | 18 | 18 | 18 | 18 | mm |
| Up Current Draw | 3.852 | 3.994 | | | | | A |
| Time for motion | 2.9 | 1.8 | | | | | s |
| Speed | 6.21 | 10 | | | | | mm/s |
| Down Current Draw | 1.933 | 2.306 | | | | | A |
| Time for motion | 2.4 | 1.6 | | | | | s |
| Speed | 7.5 | 11.25 | | | | | mm/s |
| Rear Vert Travel | 45 | 45 | 45 | 45 | 45 | 45 | mm |
| Up Current Draw | 4.323 | 4.73 | | | | | A |
| Time for motion | 6.1 | 4 | | | | | s |
| Speed | 7.38 | 11.25 | | | | | mm/s |
| Down Current Draw | 1.704 | 2.247 | | | | | A |
| Time for motion | 4.7 | 3.2 | | | | | s |
| Speed | 9.57 | 14.06 | | | | | mm/s |
| Rec Travel | 76.7 | 76.7 | 76.7 | 76.7 | 76.7 | 76.7 | deg |
| Up Current Draw | 2.919 | 3.205 | 4.04 | 4.345 | 2.069 | 2.994 | A |
| Time for motion | 18.2 | 11.8 | 21.1 | 18.8 | 15.3 | 8.7 | s |
| Speed | 4.21 | 6.5 | 3.635 | 4.080 | 5.013 | 8.816 | deg/s |
| Down Current Draw | 2.051 | 2.37 | 5.502 | 4.742 | 1.78 | 2.046 | A |
| Time for motion | 17.1 | 11 | 24.4 | 21.3 | 14.8 | 8.2 | s |
| Speed | 4.49 | 6.97 | 3.14 | 3.60 | 5.18 | 9.35 | deg/s |

ELECTRONIC CONTROL SYSTEM WITH TORQUE AND/OR SPEED BOOST FOR MOTOR VEHICLE SEATS

CROSS-REFERENCE TO RELATED APPLICATIONS

This application claims priority benefit of U.S. Provisional Patent Application No. 60/659,589 filed on Mar. 8, 2005, the disclosure of which is expressly incorporated herein in its entirety.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a system and method for controlling motor vehicle seats and, more particularly, to a system and method for controlling motors that boosts the speed and/or torque output of the motors.

BACKGROUND OF THE INVENTION

Many devices include electric motors for operation. For example, motor vehicles often have powered seats, powered adjustable pedals, powered windows, powered sun roofs, powered doors, and/or powered lift or tail gates. Each of these devices is typically operated by DC motors. Powered motor vehicle seats often are adjustable in several directions such as, for example, in a forward/rearward direction and a vertical direction. The user typically engages a switch that activates the motor to move the seat in the desired direction and releases the switch to deactivate the motor when the seat reaches a desired location.

While these devices may provide adequate results in adjusting the seats, the movement can be undesirably slow at times. For example, movement can be undesirably slow when the user desires to move the seat an extended distance, when the seat is moved for ingress or egress of the user, and/or when the seat automatically moves to better protect the occupant if an imminent crash of the motor vehicle is detected by sensors. The relatively slower movement of the seat is desirable during normal operation of the seat so that the user can make fine adjustments to the seat position. The different speeds could be obtained by utilizing multi-speed motors, multiple motors, and/or larger motors but there is an ongoing desire in the industry to reduce size, weight, and/or cost of these devices. Accordingly, there is a need in the art for an improved system and method for controlling motor vehicle seats.

SUMMARY OF THE INVENTION

The present invention provides a system and method for controlling motor vehicle seats. According to the present invention, a motor vehicle seat adjuster comprises, in combination, a DC motor, and a control system operably connected to the motor to control seat motion to a desired profile. Power to the motor is variable from less than 100% of normal power to greater than 100% of normal power. Controlling seat motion to a desired profile can give the occupant the sense and feel of luxury as well as a smoother more controlled ride.

According to another aspect of the present invention, a motor vehicle seat adjuster comprising, in combination, a DC motor, and a control system operably connected to the motor to control seat motion to a desired profile. Parameters of the profile are customizable.

According to another aspect of the present invention, motor vehicle seat adjuster comprises, in combination, a DC motor and a control system operably connected to the motor to control seat motion to a desired profile. The desired profile includes a starting power of about 0% to about 50% full power, a normal operating power of about 90% to about 100% of full power, and a boost operating power of at least about 180% of full power.

According to another aspect of the present invention, motor vehicle seat adjuster comprises, in combination, a DC motor and a control system operably connected to the motor to control seat motion to a desired profile. The desired profile includes a starting power of about 0% to about 50% full power, a normal operating power of about 90% to about 100% of full power, and a boost operating power of at least about 180% of full power. The desired profile also includes an activation start time in the range of 10 ms to 500 ms, a soft start time in the range of about 10 ms to about 500 ms, a ramp up of about 0% to about 10% per 5 ms, a regulation response time of less than or equal to about 250 ms, a regulation overshoot of less than or equal to +/−25%, a regulation band less than or equal to +/−10%, a coast time of less than or equal to about 200 ms, position overshoot of less than or equal to about 2 mm displacement, a ramp down of about 0% to about 10% per 5 ms, and a normal operating speed of about 5 mm/s to about 50 mm/s.

From the foregoing disclosure and the following more detailed description of various preferred embodiments it will be apparent to those skilled in the art that the present invention provides a significant advance in the technology and art of control systems for motor vehicle seats. Particularly significant in this regard is the potential the invention affords for providing a high quality, reliable, low cost system providing variable torque and/or speed outputs. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 9 is a table showing a speed of operation for the seat assembly of FIG. 1;

Figure 1:
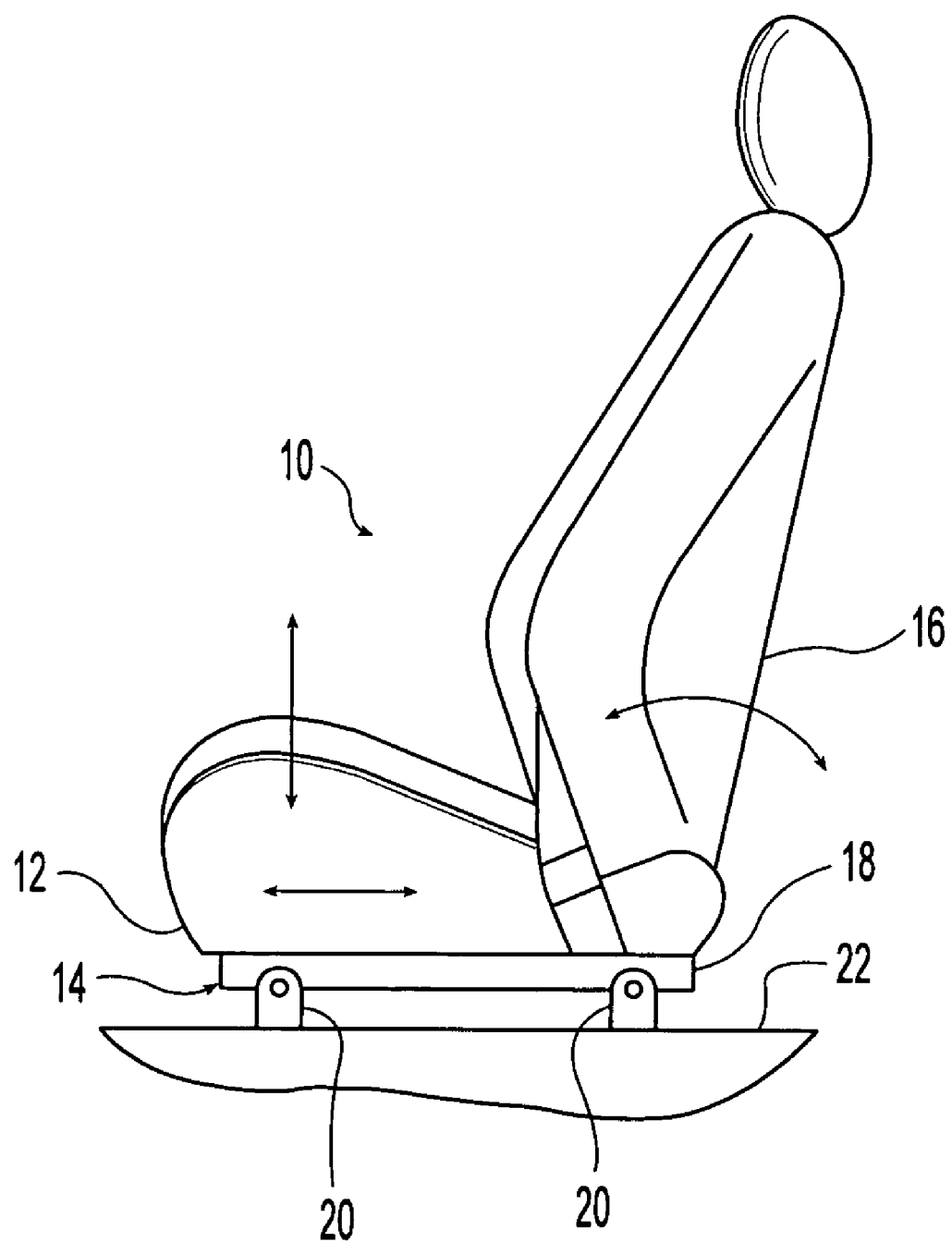
FIG. 1 is a perspective view of a powered seat assembly for a motor vehicle according to a preferred embodiment of the present invention.

It should be understood that the appended drawings are not necessarily to scale, presenting a somewhat simplified representation of various preferred features illustrative of the basic principles of the invention. The specific design features of a control system as disclosed herein, including, for example, specific dimensions, orientations, locations, and selections of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the system illustrated in the drawings. In general, up or upward generally refers to an upward direction within the plane of the paper in FIG. 1 and down or downward generally refers to a downward direction within the plane of the paper in FIG. 1. Also in general, fore or forward refers to a direction toward the front of the motor vehicle, that is, generally toward the left within the plane of the paper in FIG. 1 and aft or rearward refers to a direction toward the rear of the motor vehicle, that is, generally toward the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electronic control system disclosed herein. The following detailed discussion of various alternative and preferred embodiments will illustrate the general principles of the invention with reference to a powered seat assembly for a motor vehicle such as an automobile, sport utility vehicle (SUV), truck, or the like. Other embodiments suitable for other applications will be apparent to those skilled in the art given the benefit of this disclosure, such as, for example, powered windows, powered sun roofs, powered doors, powered lift or tail gates, or any other like powered assembly utilizing a DC motor.

Referring now to the drawings, FIG. 1 schematically shows a powered adjustable vehicle seat assembly 10 according to a preferred embodiment of the present invention. The illustrated seat assembly 10 includes a seat bottom 12 which is mounted within a motor vehicle on a mounting assembly 14. A seat back 16 is pivotably supported with respect to the seat bottom 12. The illustrated seat assembly 10 is an "eight-way" powered adjustable seat providing horizontal (fore/aft), vertical (up/down), front up/down, rear up/down, and recline (tilt) adjustment. It is understood, however, that the present invention described herein can alternatively be utilized with "two-way", "four-way", "six-way", or other power adjustable seats utilizing at least one DC motor.

The mounting assembly 14 includes a pair of substantially parallel and laterally spaced-apart track assemblies 18 which extend in a longitudinal or forward/rearward direction of the motor vehicle. The track assemblies 18 are mounted to a vehicle structure 22 such as a vehicle floor by mounting brackets 20.

Each of the track assemblies 18 is provided with drive mechanisms to selectively move the tracks assemblies 14 and selectively adjust the position of the seat 10. The drive mechanisms include at least one electric drive motor. The drive motor is preferably a D.C., single speed, brushed motor operated by a control system or circuit 24. The motor is of a type such that power to the motor is variable.

Figure 2:
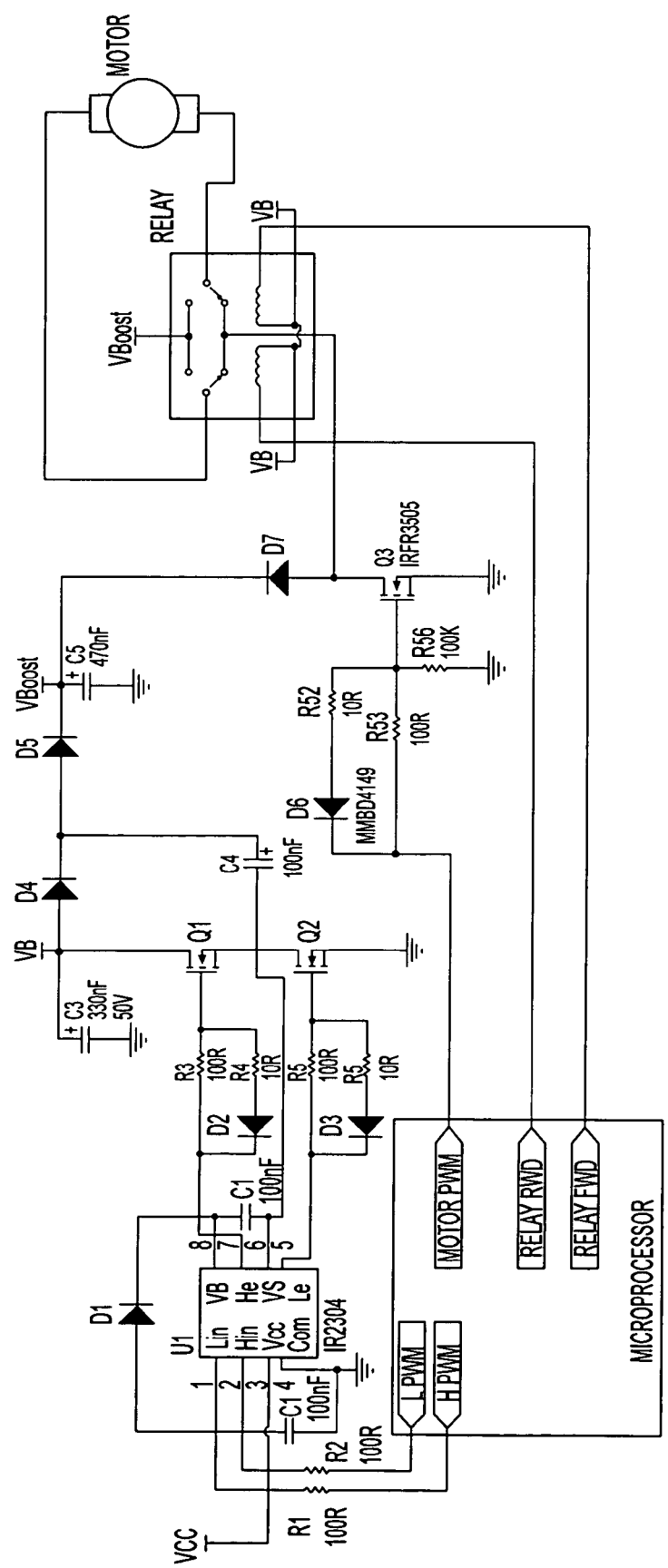
FIG. 2 is a schematic view of a control system for a motor of the seat assembly of FIG. 1 where a high-side to a motor is boosted.
Figure 3:
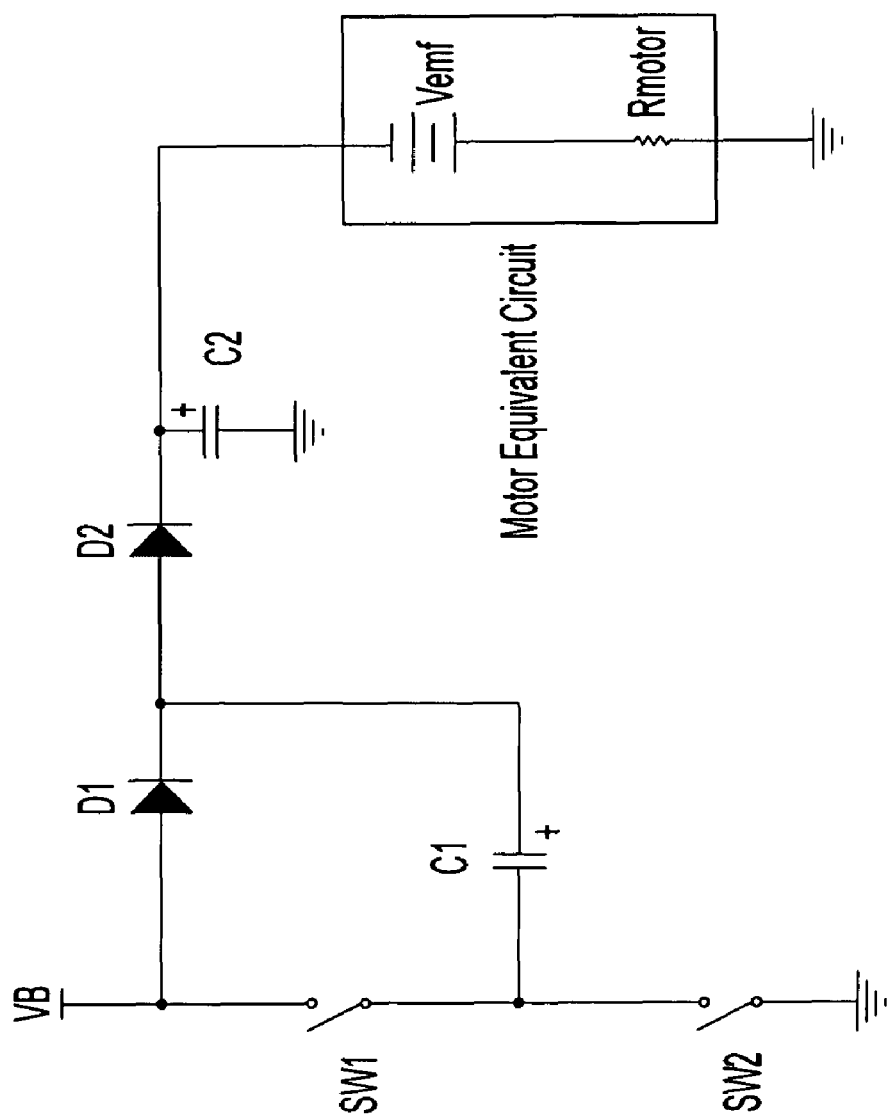
FIG. 3 is a schematic view of an equivalent circuit showing the boost function of the control system of FIG. 2.

FIG. 2 schematically shows an example of the control system 24 for the drive motor of the seat assembly 10. The illustrated control system includes a microprocessor (or other circuitry), a power boost circuit, an H-bridge relay, and a low-side PWM control. FIG. 3 shows a simplified equivalent circuit for the boost section of the circuit of FIG. 2 incorporating a half-bridge switching configuration. The half-bridge circuit includes first and second switches SW1, SW2 connected in series and connecting a vehicle power source VB to vehicle ground GND. The boost circuit also includes a first diode D1, a second diode D2, a second capacitor C2, and a DC brush motor M (shown as $V_{emf}$ and $R_{motor}$) connecting points between the vehicle power source VB and the vehicle ground GND. The first and second switches SW1, SW2 can each be a relay, FET, semiconductor, or any other suitable switching device as discussed in more detail hereinafter. The first and second switches SW1, SW2 can be integrated into a single package in the case of a semiconductor device or relay. The boost circuit also includes a third or connecting leg with an energy storage device or first capacitor C1 that connects a point of the first leg located between the first and second switches SW1, SW2 and a point of the second leg located between the junction of the first and second diodes D1, D2. The illustrated energy storage device C1 is a capacitor but any other suitable energy storage device can alternatively be utilized such as, for example, an inductor.

Figure 4:
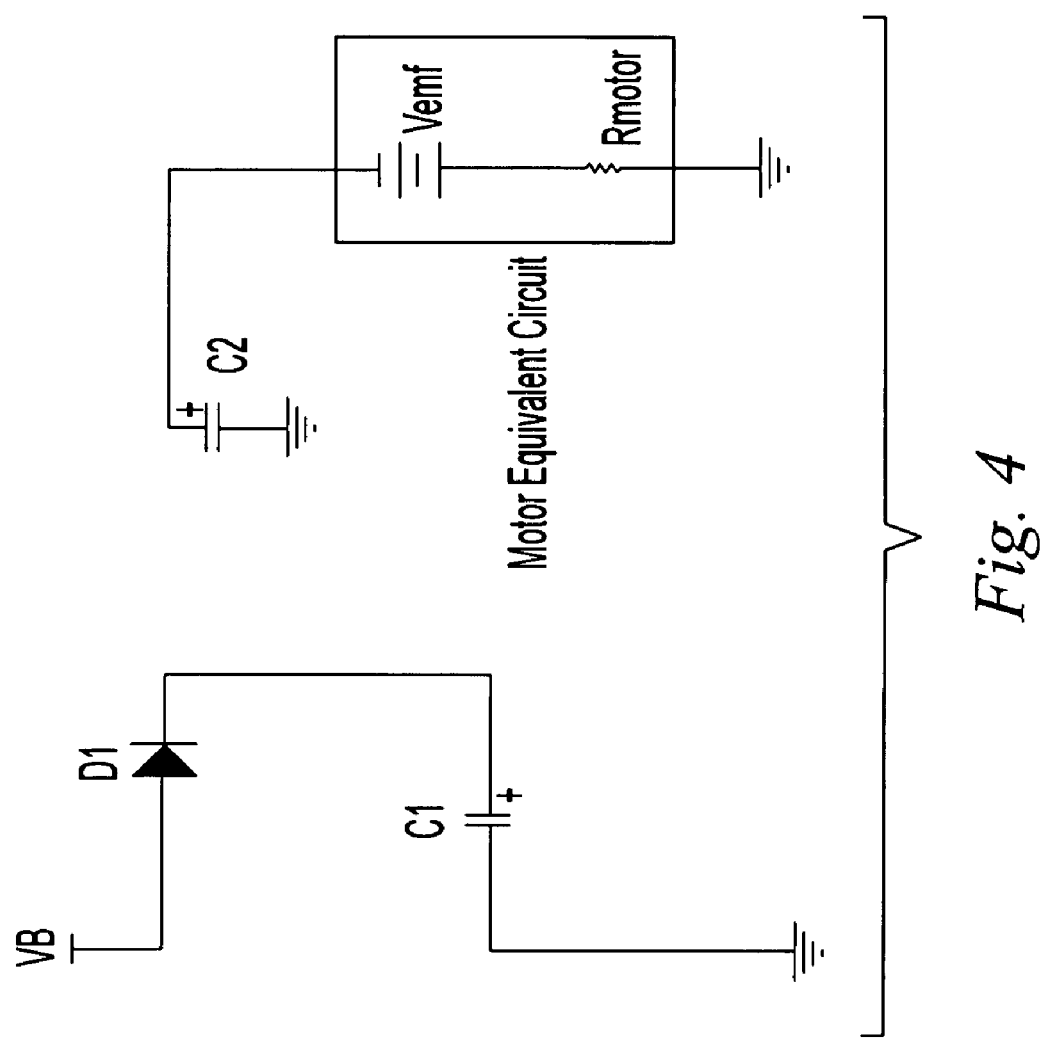
FIG. 4 is a schematic view of an equivalent circuit showing an energy storage phase of the circuit of FIG. 3.

Initially, as shown in FIG. 3, the first and second switches SW1, SW2 are open and motor current is defined by $I_{motor} = (VB - V_{D1} - V_{D2} - V_{emf})/R_{motor}$ (Equation 1). Primary phases of operation are energy storage and energy transfer stages with a short period in between when the first and second switches SW1 and SW2 are both open to prevent a short-circuit condition between vehicle power VB and vehicle ground GND. FIG. 4 illustrates the energy storage phase. The second switch SW2 is closed and the first capacitor C1 charges via the first diode D1. The second diode D2 is biased off and the motor is powered directly from the second capacitor C2. The rate of charge of the first capacitor C1 is determined by its capacitance and the impedance of the second switch SW2 (typically 5 to 10 milli-ohms) and the voltage across the first capacitor C1 is $V_{C1}=VB-V_{D1}$ (Equation 2). For switching frequencies in the 10 to 20 kilohertz range at 50% duty cycle, the first capacitor C1 can typically be expected to reach full charge in less than 50 us. For the first charge cycle, the second capacitor C2 is charged to $V_{C2}=VB-V_{D1}-V_{D2}$ (Equation 3) and motor current is $I_{motor}=(V_{C2}-V_{emf})/R_{motor}$ (Equation 4). When the first capacitor C1 is charged (energy stored) both the first and second switches SW1, SW2 are opened briefly (microseconds or less) and the first switch SW1 closes for the energy transfer stage (best shown in FIG. 5). During the transfer stage, the first capacitor C1 is connected in series with the second diode D2 serving to charge the second capacitor C2 to a higher level defined by $V_{C2}'=(VB+V_{C1}-V_{D2})$ (Equation 5). Instantaneous motor current is further defined as $I_{motor}'=(V_{C2}'-V_{emf})/R_{motor}$ (Equation 6) where $V_{C2}'>V_{C2}$ (Equation 7). The first and second switches SW1, SW2 are then turned off briefly and the energy storage phase is started again, this time with the second capacitor C2 charged to near 2×VB. Once during each consecutive energy storage phase, the voltage at the second capacitor C2 ($V_{C2}$) drops exponentially as the motor consumes the energy stored in the second capacitor C2, the level it drops is dependant on the amount of loading on the motor. Consequentially, the motor current $I_{motor}'$ decays exponentially from its instantaneous value. The next transfer cycle recharges the second capacitor C2 and the cycle repeats.

As known to those skilled in the art, as a higher voltage is used to power a motor of this type and the load output has not changed, the result is a higher speed in RPM of the motor shaft. As the speed of the shaft increases, so does the level of the back EMF voltage, $V_{emf}$, as defined by $V_{emf}=RPM \times ConstantV_{emf}$ (Equation 8). This serves to counter-act on the current supplied to the motor such that there is a net increase in current draw of near zero and increase in RPM (near 100% or double in this case). If loading on the motor increases, the current will increase accordingly (as RPM and $V_{emf}$ decrease) and the speed will drop below the near double level. In this case, torque output to the motor will be boosted to a level greater than normally available; as the load increases such that the RPM is the same as normal (not boosted) the torque and motor current will be at a level near double. If twice the input voltage is applied, maximum torque and current at stall will be theoretically doubled as there is no $V_{emf}$ at stall. In either case, conservation of power dictates that for a fully boosted speed or torque, current supplied by VB will be near double of its normal level.

For example, but not limited thereto, if VB=12 volts, $R_{motor}$=4 ohms, $V_{emf}$=2 volts, and $V_{D1}=V_{D2}$=0.7 volts, when both SW1 and SW2 are initially open, $I_{motor}$=(12 volts–0.7 volts–0.7 volts–2 volts)/4 ohms=2.15 amps (using Equation 1 as a first order estimate) and $V_{C1}$=12 volts–0.7 volts=11.3 volts (using Equation 2 as a first order estimate). The instant that the first switch SW1 is opened and the second switch SW2 is closed, the voltage across C2 will quickly rise to $V_{C2}$=(12 volts+11.3 volts–0.7 volts)=22.6 volts (using Equation 5) and $I_{motor}'$=(22.6 volts–2 volts)/4 ohms=5.15 amps (using Equation 6). It should be noted that the impedance of the voltage source VB, the values of the first capacitor C1 and the second capacitor C2 will determine how long it will take for the voltage $V_{C2}$ of the second capacitor C2 to rise and exactly to what level, and if the first capacitor C1 is transferring far less energy than the second capacitor C2 is capable of storing, then there may not be enough charge to raise the voltage of the second capacitor C2 sufficiently. More advanced calculations can be performed to more accurately predict the circuit performance for a given application. With each consecutive cycle, the additional voltage to the motor will serve to increase the speed in RPMs and consequentially increase the $V_{emf}$ thus lowering the current, $I_{motor}$, to near its original value of 2.15 amps but at increased (boosted) speed. If additional load is placed on the motor, it will counteract the tendency for RPM to increase, then $V_{emf}$ will not increase and the current will continue to be elevated. In a brushed DC motor such as this, an increase in motor current will result in an increase of torque output. The alternating switching of the first and second switches SW1 and SW2 continues to keep storing energy in the first capacitor C1 and transferring a portion of it to the second capacitor C2. The switching frequency and duty-cycle determine how much energy is stored and how much is transferred and may be varied by a micro-controller or similar circuitry to optimize the desired level of boost of speed or torque for any particular application or operating conditions. The primary variables re the charge rate and the transfer rate. The charge rate is the duty-cycle in that the capacitor is charged and can be from about 0% to about 50% to achieve 100% boost. The transfer rate is the duty-cycle in that the energy stored in the charged capacitor is summed with the battery voltage to be transferred to the load and can be typically from about 0% to about 50%. As energy stored in the capacitor reaches a potential equal approximately that of the battery voltage (full power), the boost power is equal to approximately twice that of the battery voltage (full power).

Figure 13:
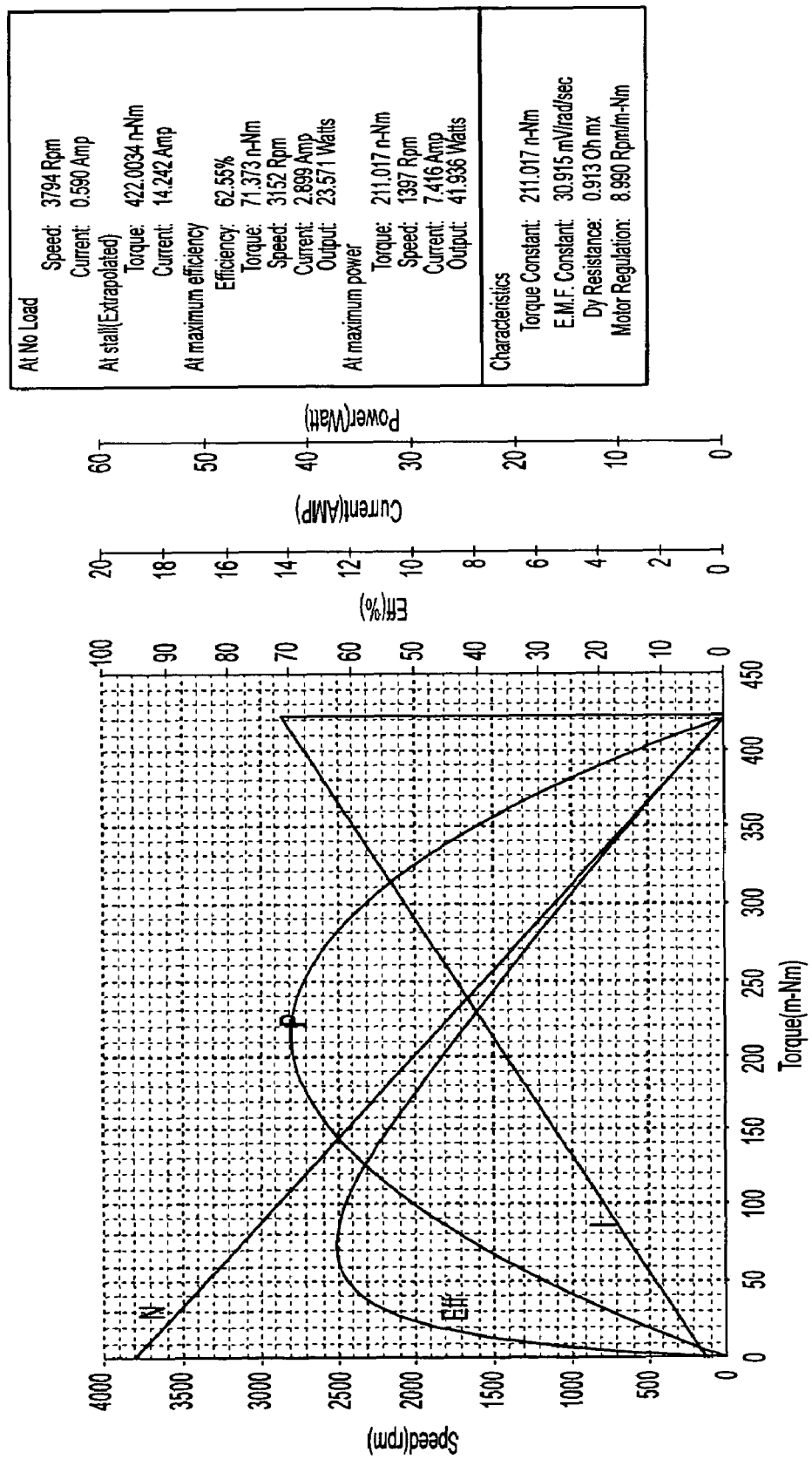
FIG. 13 is a graphic view of performance data for a DC brushed motor typically used in motor vehicle seat systems.

For example, but not limited thereto, using the motor performance curves of FIG. 13, "normal" or non-boosted torque to a motor of the motor equivalent circuit in FIG. 3 can be calculated. At $V_{C2=13}$ volts, as in this case motor curves are given for 13.0V, and a speed of 3000 RPM or f=50 Hz, $V_{emf}$=30.915 mV/rad/sec*2pi*f=9.71 volts. The "normal" current in the motor is $I_{motor}=(V_{C2}-V_{emf})/R_{motor}$= (13 volts–9.71 volts)/0.913 ohms=3.60 amps. Calculating torque using the torque constant results in: Torque= (30.915m-Nm/A*3.60 amps)=111.4m-Nm.

For the circuit of FIG. 3, when the switches SW1 and SW2 are actively switching to boost the voltage $V_{C2}$, the effect on motor speed can be calculated on a first order. Factors such as component impedance, switching losses, thermal losses, and power loss due to exponential discharge of the capacitors C1 and C2 are not included in the following equations and may or may not be significant depending on the application and conditions of use. For a boosted versus non-boosted comparison, assume the voltage available to the circuit is VB=13 volts. The voltage $V_{C2}$ is given by $V_{C2}$= (13.0 volts+12.3 volts–0.7 volts)=24.6 volts (using Equation 5). If the load is unchanged the current draw is approximately the same as previously calculated (3.60 amps) there will be a new $V_{emf}$ level to maintain the equilibrium. This $V_{emf}$ can be calculated by rearranging equation: $I_{motor}$= $(V_{C2}-V_{emf})/R_{motor}$, to: $V_{emf}=V_{C2}-(I_{motor} * R_{motor})$=24.6 volts–(3.6 amps*0.913 ohms)=21.31 volts. Using the EMF constant from the motor performance curves (shown in FIG. 13) $V_{emf}$=30.915 mV/rad/sec*2pi*f, solving for f: f=$V_{emf}$/ (30.915 mV/rad/sec*2pi)=109.7 Hz or, 6583 RPM. This demonstrates that the boost function can deliver approximately twice the speed normally available.

The same example can be used to demonstrate the function of boosted torque. At stall, $V_{emf}$=0 volts as RPM=0. $I_{motor}$ can be expressed as $I_{motor@stall}=V_{C2}/R_{motor}$, or in this example (when boosted), $I_{motor@stall}$=24.6 volts/0.913 ohms=26.94 amps. When the boost function is not operating, the stall current can be expressed as $I_{motor@stall}=V_{C2}/R_{motor}$ where $V_{C2}$=13 volts, $I_{motor@stall}$=13 volts/0.913 ohms=14.24 amps. Motor torque at stall can be calculated using the motor's torque constant as shown on FIG. 13. For non-boosted: Torque@stall=(30.915m-Nm/A*14.24 amps)=440 m-Nm. For non-boosted: Torque@stall= (30.915m-Nm/A*26.94 amps)=833 m-Nm. The torque is boosted by a factor of: 833/440=1.9. Losses through the diodes D1, D2 can be reduced (by diode selection or other circuitry) and provide boost factors approaching 2, or double. Boosted torque at load points other than stall (where Vemf>0 volts) can be calculated using the motor characteristic and standard motor equations. For torque, the boosted factor will decrease from the stall point to the point of no motor load. For speed, the boosted factor will increase from the stall point to the point of no motor load. Theoretically, boosted torque approaches ×2 at stall and boosted speed approaches ×2 at no load. Circuit components, motor properties, and exact loadings must be considered to perform accurate calculations of speed or torque. Most practical operating regions use a combination of boosted torque and speed, neither reaching a complete factor of ×2.

The circuit as shown in FIG. 2 implements a microprocessor which may be used to monitor an input from an external device such as a Hall-Effect sensor attached directly to the motor or to the mechanism. Such an input can be used as feedback to control the amount of boost delivered to the motor if motor speed must be precisely controlled. Use of a current sense on the motor can also be added if torque boost must be precisely controlled. The circuit of FIG. 2 has a low-side switching device Q3 which can be used to further regulate power to the motor no matter if the boost function is active or not.

The above described control circuit was tested with a standard production seat motor used on a horizontal drive. The "normal" current was measured to be 1.73 amps and the "normal" speed was measured to be 57 Hz (3420 RPM). The boost H current was measured to be 3.32 amps and the "boost" speed was measured to be 85.5 Hz (5130 RPM). The "normal" motor output torque is 53.48 m-Nm while the "boost" motor output torque is 102.64 m-Nm.

It should be noted that upon changing the PWM duty-cycle in this control circuit, higher gains in speed and torque may be realized depending on load conditions and motor used; thus the microprocessor, or similar control circuit as shown in FIG. 2, may be used to control the level of power output to the motor. It should also be noted that as the load on the motor increases, $V_{emf}$ will decrease. Also as power to the motor increases, $V_{emf}$ will increase if the motor speed is allowed to increase.

Figure 5:
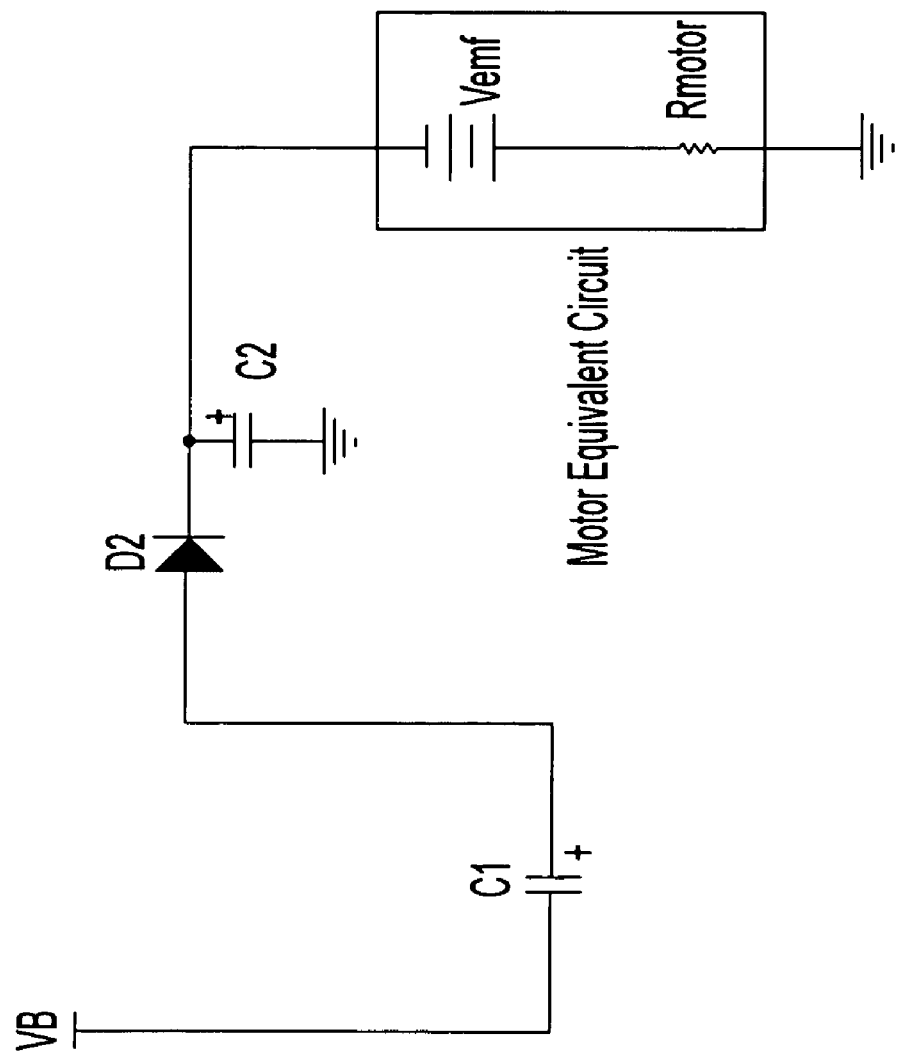
FIG. 5 is a schematic view of an equivalent circuit showing the an energy transfer phase of the circuit of FIG. 3.

As illustrated by the simplified circuit of FIGS. 3 to 5, the first and second switches S1, S2 are alternately turned on and off by the PWM input providing charging and discharging paths for the capacitor C1. It is noted that any other suitable means for switching the switches can alternatively be utilized. The purpose of the second capacitor is to stabilize and store the boosted voltage but it may be omitted with some applications.

FIG. 2 shows a practical solid state example of the control circuit. The half bridge (high and low side) driver has a built in boot strap circuit, which allows the use of two N-channel FETs Q1, Q2 and ensures that the FETs are not on at the same time (shoot through condition). Other similar half-bridge circuits may be used, with dual or single PWM inputs. The signals L PWM and H PWM can be generated by a microprocessor or from solid state circuitry and are used to turn on the high and low side FETs accordingly. The duty cycle of the signal affects the charge/discharge time of the capacitor C4, which affects the amount of energy delivered to the motor circuit. When both FETs are off or the half-bridge driver is inactive, the motor current only passes through the diodes D4 and D5 and the motor torque and speed is normal (with some losses through the diodes D4, D5). When L PWM is high, H PWM is low, HO goes low and LO goes high, turning on Q2 and leaving Q1 open, which charges the capacitor C4 through Q2. When H PWM goes low, L PWM is high and HO goes high closing Q1 and LO goes low opening Q2 and motor current is supplied by C4 and VB via Q1. When a PWM is applied to H PWM and its compliment to L PWM, Q1 and Q2 alternately charge/discharge the capacitor C4. Energy from the capacitor C4 during the discharge period is transferred to the motor for increased torque and/or speed. The capacitor C5 stabilizes and filters the boosted voltage to the motor. The relay is used to change direction of the motor by controlling polarity to the motor. The FET switch Q3 can be used to control the amount of full boosted power to the motor. The diode D7 is a "flywheel" diode and briefly provides a path for motor current when Q3 is switched off.

Figure 6:
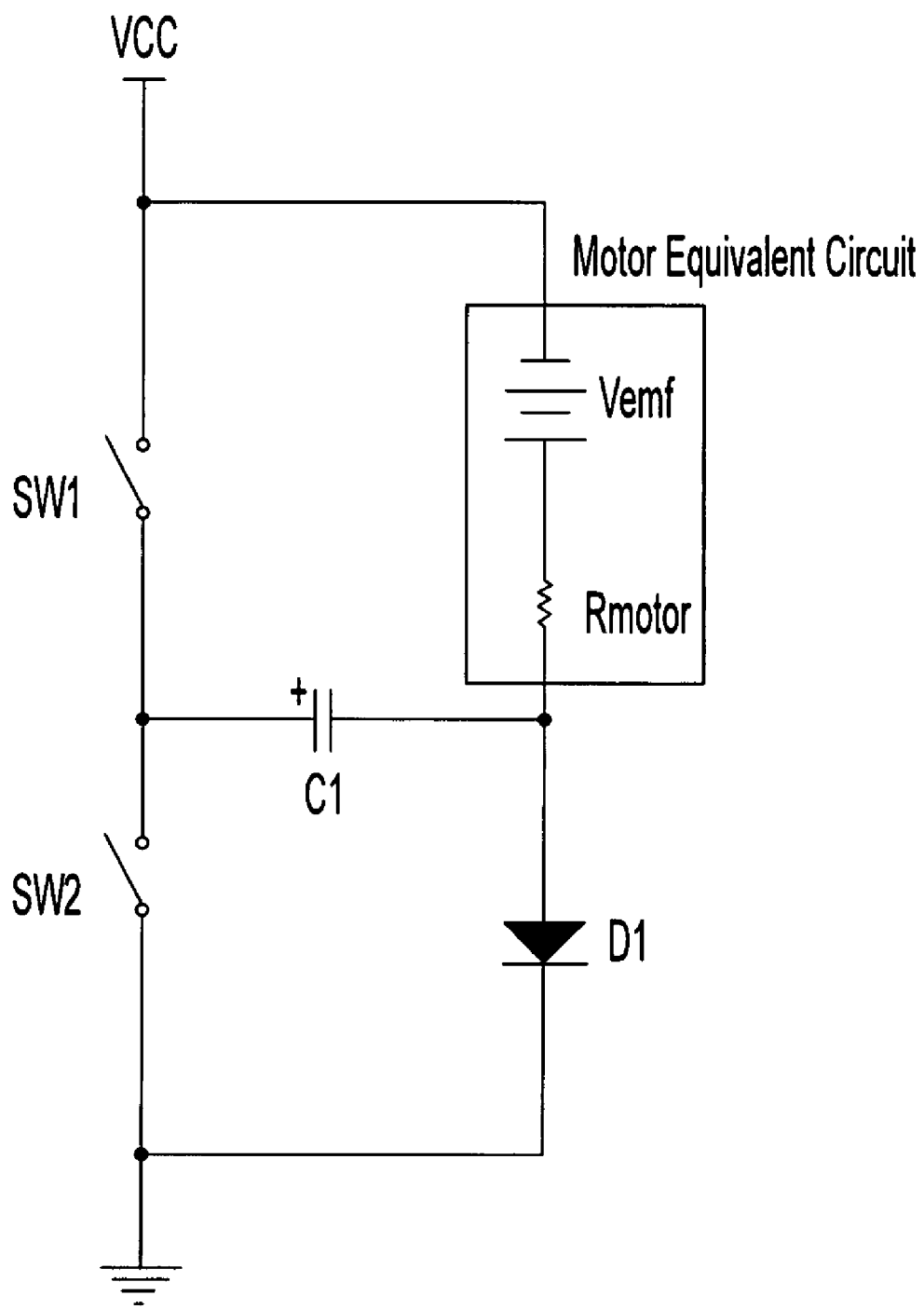
FIG. 6 is a schematic view of an alternative boost circuit where a low-side to the motor is boosted.
Figure 7:
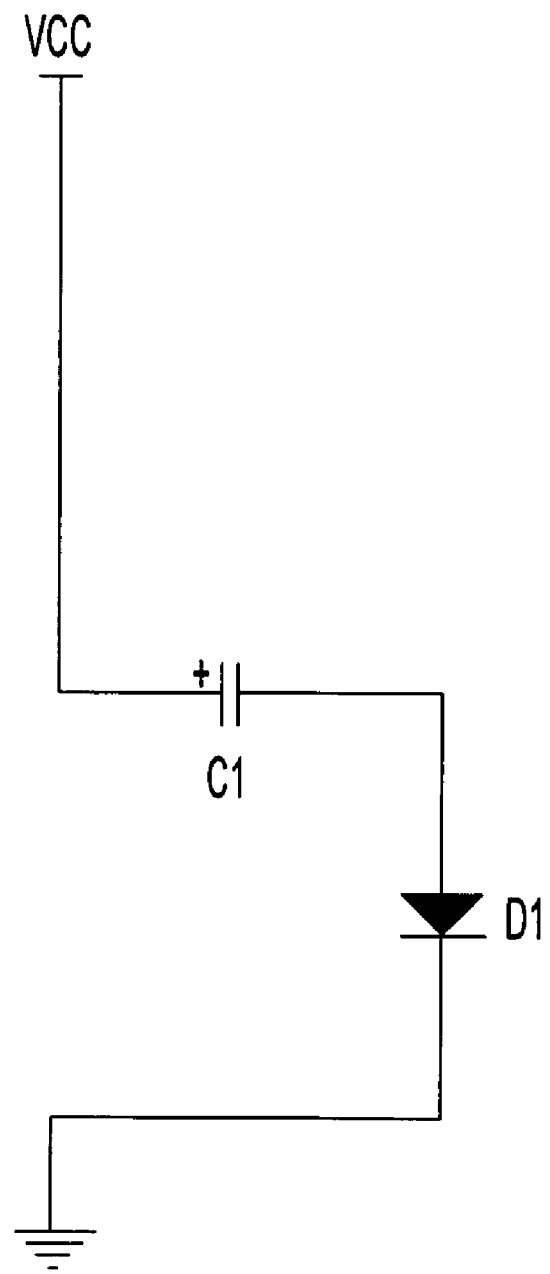
FIG. 7 is a schematic view of an equivalent circuit showing the energy storage phase of the circuit of FIG. 6.
Figure 8:
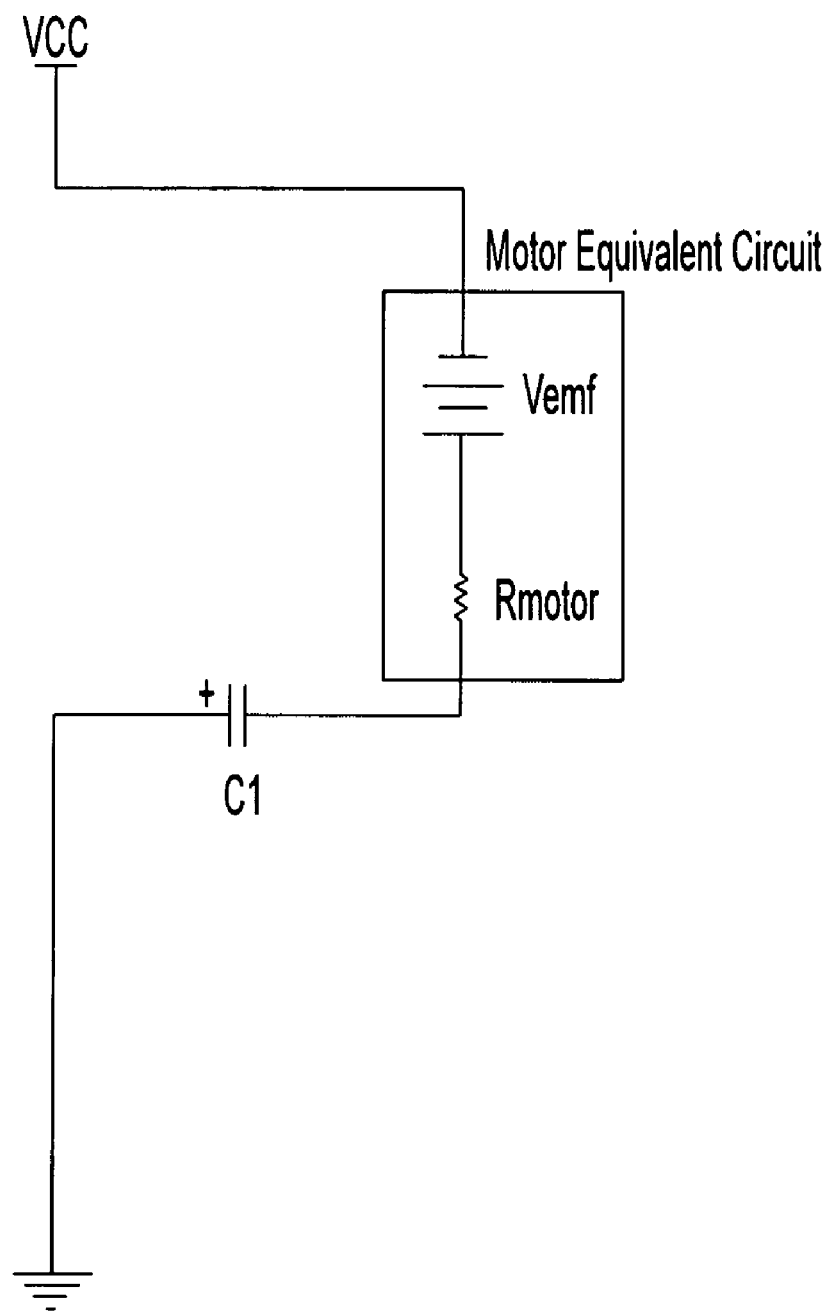
FIG. 8 is a schematic view of an equivalent circuit showing the energy transfer phase of the circuit of FIG. 6.

FIG. 6 shows an simplified alternative circuit for achieving boost to the motor where the low-side, or return side, of the motor is boosted and switching of the first and second switches SW1 and SW2 may be controlled by a microprocessor or other circuitry. This circuit is simpler than the high-side boost circuits of FIG. 2 and FIG. 3. One primary difference is that the motor power has no fixed return at 0 volts potential; the return is boosted at a negative potential with respect to the circuit ground. This may have advantages or disadvantages depending on the exact application. In FIG. 6, where for example VCC=12 volts, $R_{motor}$=1 ohm, $V_{D1}$=0.7 volts, and $V_{emf}$=10 volts, normal motor current is defined as $I_{motor}$=(VCC−$V_{emf}$−VD1)/$R_{motor}$=(12 volts−10 volts−0.7 volts)/1 ohm=1.3 amps. FIG. 7 shows when SW1 is closed and the first capacitor C1 charges to $V_{C1}$=VCC−$V_{D1}$=12 volts−0.7 volts=11.3 volts. In FIG. 8, the first switch SW1 is opened and the second switch SW2 closes connecting the first capacitor C1 with the low-side of the motor. The instantaneous current available to the motor is now defined as $I_{motor}$=(VCC−$V_{emf}$+$V_{C1}$)/$R_{motor}$=(12 volts−10 volts+11.3 volts)/1 ohm=13.3 amps. As previously described, this additional power to the motor will serve to increase RPM and thus increase $V_{emf}$ to the point that the motor current reaches approximately its original value of 1.3 amps, resulting in a boosted speed. Also true for this configuration, if the loading on the motor increases, the current will rise due to the restriction in rise of $V_{emf}$ resulting in an elevated torque output form the motor. An additional diode and capacitor can be added to provide filtering and energy storage to improve output power in a similar fashion as the second diode D2 and the second capacitor C2 in the circuit shown in FIG. 3.

FIG. 9 shows "normal" and "boost" results for a powered seat assembly tested by Dura Automotive Systems, Inc. of Bracebridge, Ontario, Canada having the motor control circuit of FIG. 6, where voltage is 13.5 volts and load is 200 lbs. Results are shown for horizontal travel, front vertical travel, rear vertical travel, and recline travel at ambient, −30 C. and +80 C. temperatures. As can be seen, the control system of the present invention provides an increase of up to 60% in motor output speed when boosted compared to normal operation.

Figure 12:
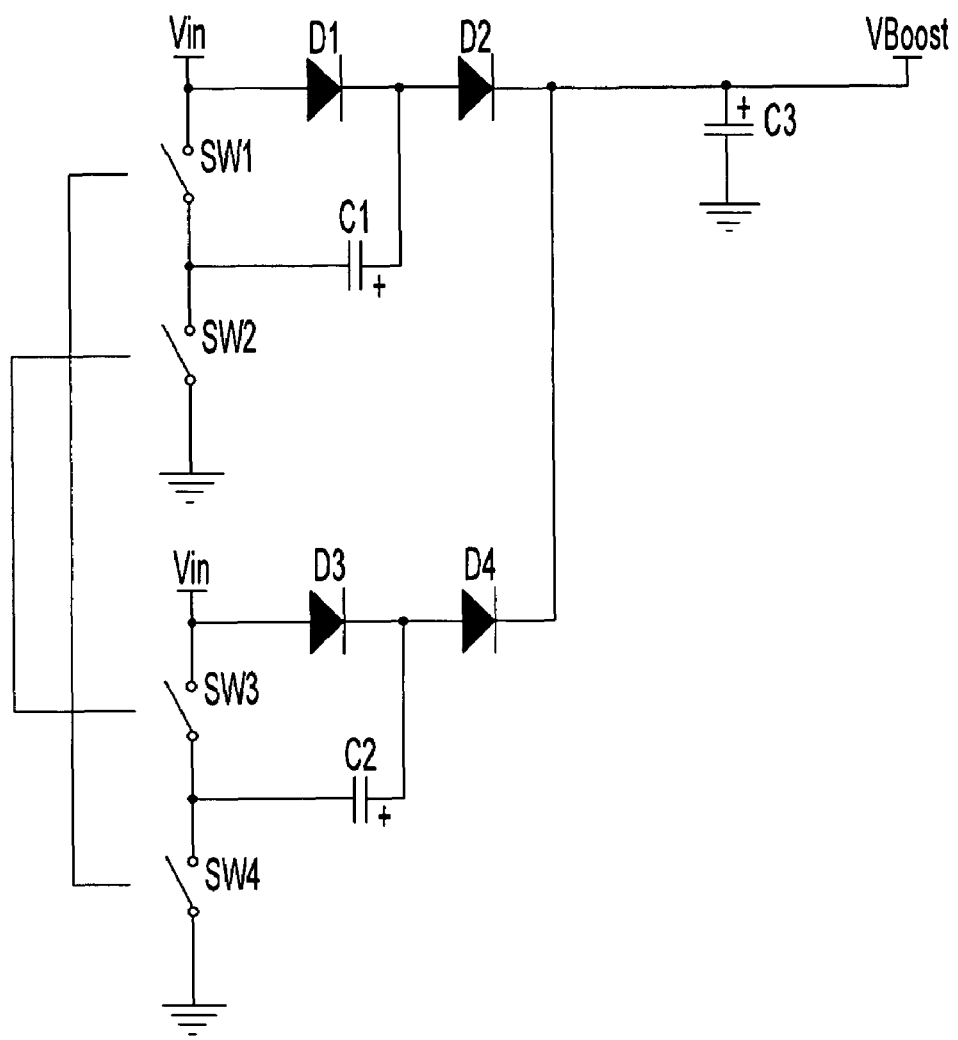
FIG. 12 is a schematic view of an equivalent circuit showing a full-bridge boost controller.

FIG. 12 shows a full-bridge high-side boost circuit implementing four switches to alternately store and transfer energy from the first and second capacitors C1 and C2. The advantage of this configuration is less stress on the energy transfer capacitors C1 and C2 as there are two. The ripple on the filter capacitor C3 is double in frequency and lower in amplitude than that of the filter capacitor C2 in the circuit of FIG. 3. Lower ripple levels mean higher output voltage and the available current to the motor is higher. Lower ripple may also offer improved EMC. The circuit is essentially 2 half-bridge circuits operated out-of-phase such that while one half-bridge is charging its storage capacitor the other half-bridge is transferring energy to the output. In this manner, the energy in the output capacitor C3 is being replenished at twice the rate of the circuit in FIG. 3 if the switching frequencies are the same. The switches SW1, SW2, SW3, and SW4 are also less stressed than a single high-side half-bridge approach. This may be an advantageous circuit if two commercially available integrated half-bridges are used. Integrated half-bridges also often have FET drive circuitry and high side and low side FETs built-in and occupy a small space but typically have lower power ratings that building the circuit with discrete components. A full-bridge may be more suited to using an integrated half-bridge because of the sharing of current in each half of the bridge. Such a device could also be used for the circuit of FIG. 3, but the single half-bridge would have to be rated to handle all the power required. More than two half-bridges could be used in the same manner but with increased complexity and cost. The low-side boost circuit of FIG. 6 could also be configured to operate with multiple half-bridge sections.

Both a low-side and a high-side boost circuit of the various circuits presented could be configured together to operate the same motor to increase torque or speed to the motor by a factor of approaching ×3. Cascading or coupling multiple boost circuits could extend the boost factor by greater than ×3 but with added cost and complexity. An inductor could be also used to store and transfer energy rather than, or in conjunction with the capacitor with some modification to the circuits presented here. A transformer may also be used in a similar fashion.

The above-described control system can be utilized to boost the motor torque and/or speed to move the seat as fast as possible when pressure on the control switch by the user exceeds a predetermined period of time or travel indicating the seat is being moved an extended distance, when the seat is automatically moved to a predetermined position because predetermined conditions indicate that the user is about to ingress or egress the vehicle, when the seat is automatically moved to a predetermined position because motor vehicle sensors indicate imminent crash of the motor vehicle, and/or any other suitable situation. The control system can also be used to defined customizable seat movement profiles that accommodate multiple variables and different speeds.

Figure 10:
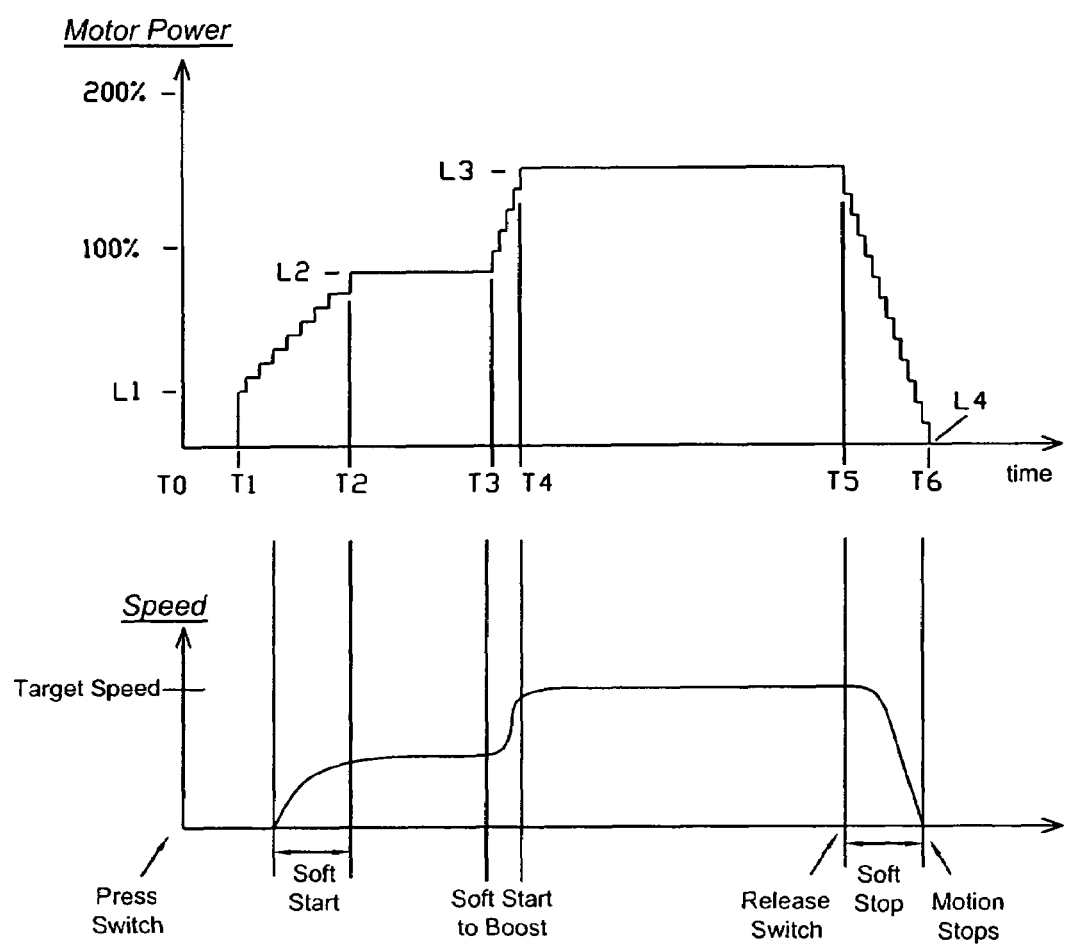
FIG. 10 is a graphic view of a seat motion profile for the seat assembly of FIG. 1.

FIG. 10 shows example motion profiles of the motor vehicle seat when an occupant activates a control switch for period T0 to T5. Initially, power is supplied to the motor with an initial power level L1. There is delay from the time the occupant activates the control switch until the seat moves. This delay or activation start time is preferably in the range of about 10 ms to about 500 ms and can be 100 ms or less. The initial power level L1 can be zero but is preferably greater than zero so that there is no dead time due to overcoming inertia and friction. The initial power level L1 is preferably a small fraction of the normal operating power level L2 such as, for example, the initial power is preferably in the range of about 0% to about 50% of normal or full power and can be about 40% of full power when the normal operating voltage is about 12 volts. The motor power is increased from the initial power level L1 until it reaches a normal operating power level L2. This power increase can be linear or nonlinear. The duration for accelerating from the initial power level L1 to the normal operating power level L2 is period T1 to T2 (the "Soft Start"). The Soft Start is preferably within the range of about 50 msec. to about 300 msec. and is more preferably about 150 msec. The ramp up of power that is, the size of each step of power increase is preferably in the range of 0% per 5 ms to 10% per 5 ms. At the normal operating power level L2, the adjuster speed is preferably in the range of about 5 mm/s to about 50 mm/s and may be about 10 mm/s. The normal operating power level L2 can be 100% of full power but is noted that the normal operating power level L2 must allow excess capacity for speed control when speed control is utilized in conjunction with the boost system, i.e. is less than 100% of full power (when no power boost is used). Thus the normal operating power level L2 is preferably near 100% of full power and can be in the range of 90% to 100% of full power. There is preferably a power adjustment or regulation band, that is, the amount of variance or fluctuation from which there is no regulation or control in the range of about 0% to about +/−10%. Regulation response time, that is, the time to regulate the system if there is a disturbance is preferably less than or equal to about 250 ms and regulation overshoot is preferably less than or equal to about +/−25%.

If the user pressures the control switch for time period T0 to T3, the boost circuit automatically increases the motor power from the normal operating power level L2 to a boost operating power level L3. This power increase can be linear or nonlinear. The boost time delay T0 to T3 is preferably in the range of about 1 sec. to about 2 sec. The boost operating power level L3 is preferably near 200% of full power and may be about 180% full power. The duration for accelerating from the normal operating power level L2 to the boost operating power level L3 is period T3 to T4 (the "Soft Speed Increase to Boost'). The Soft Speed Increase to Boost T3 to T4 is preferably within the range of about 50 msec. to about 1000 msec. and is more preferably in the range of about 150 msec to 500 msec. The ramp up of power that is, the size of each step of power decrease is preferably in the range of 0% per 5 ms to 10% per 5 ms. With Reference to FIG. 2, this transition can be achieved by varying the duty-cycle of the high and low side switches Q1, Q2 effectively varying the voltage on the capacitor C5 and the power delivered to the motor. It would best be achieved by ramping the PWM for the high side switch Q1 from 0% to approximately 50% while ramping the compliment PWM for the low side switch Q2 from 100% to approximately 50%. The microprocessor or control circuit can be used to control the PWM to the switches Q1, Q2 in order to achieve the desired ramp rate. It can be also achieved by immediately boosting the voltage at the capacitor C5 and ramping the low-side PWM with switch Q3 to control the ramp rate of power to the motor. Returning to FIG. 10, at the boost operating power level L3, the adjuster speed can be about 25 mm/s or more. It is noted that speed control is not available at the boost operating power level L3 unless there is excess capacity available for speed control. When the user releases the control switch, the motor power is decreased from the boost operating power level L3 until it reaches a reduced power level L4, most typically zero. This power decrease can be linear or nonlinear. The duration for decelerating from the boost operating power level L3 to the reduced power level L4 is period T5 to T6 (the "Soft Stop). The Soft Stop T5 to T6 is preferably within the range of about 50 msec. to about 750 msec. and is more preferably in the range of about 150 msec to 300 msec. The ramp down of power, that is, the size of each step of power decrease is preferably in the range of 0% per 5 ms to 10% per 5 ms. The coast time, that is, the time from release of the control switch to full stop is preferably less than or equal to about 200 ms and the position overshoot, that is, the distance the seat travels after the control switch is released is preferably less than or equal to about 2 mm displacement When the user releases the control switch prior to the boost delay time, the time when the boost is activated T3, motor power is decreased from the normal operating level L2 and the boost is not activated. By combining one, more or all of the preferred seat adjusting profile parameters in the control of the seat, a more comfortable or luxurious feel may be achieved.

Figure 11:
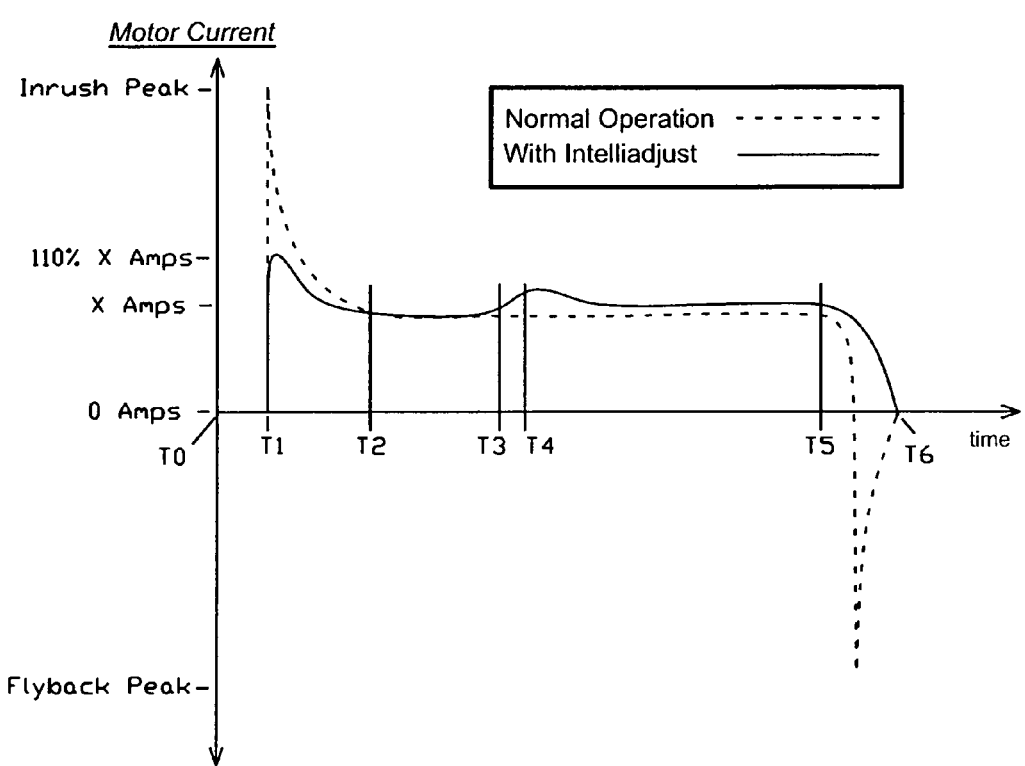
FIG. 11 is a graphic view of a motor current profile comparing a seat assembly with and without the present invention.

The effect of the soft start and the soft stop is that of an improved feel to the occupant as well as extended life of the mechanism and can also affect the transient current levels to the motor. FIG. 11 illustrates the effect of the soft-start on the peak inrush current to the motor where a nominal ramp rate can be used to limit the inrush current to 110% of its normal running current. Peak currents without soft start can exceed 200% of the nominal running current. These high currents emit undesirable electromagnetic interference (EMI) and may be stressful to some electrical components. The subjective "feel" of the seat may also be improved by adjusting the ramp rate to achieve a peak inrush of around 110% of the nominal running current but may vary from one application to another. Soft start has the effect of reducing or eliminating the flyback current (which is of opposite direction than the running current). This is because the soft stop decreases the stopping speed of the motor gradually rather than instantaneously allowing time for frictional and loading forces to absorb the energy in the motor. Flyback currents are also related to EMI and subjective "feel" of the seat. It has also been noted that the subjective "feel" of the seat may also be improved by adjusting the soft start ramp rate to reduce or eliminate the flyback current "kick". Experimentation using current profiles can determine the best soft start and stop ramp rates for any given application, and possibly eliminate or greatly reduce the need for further subjective testing.

Figure 14:
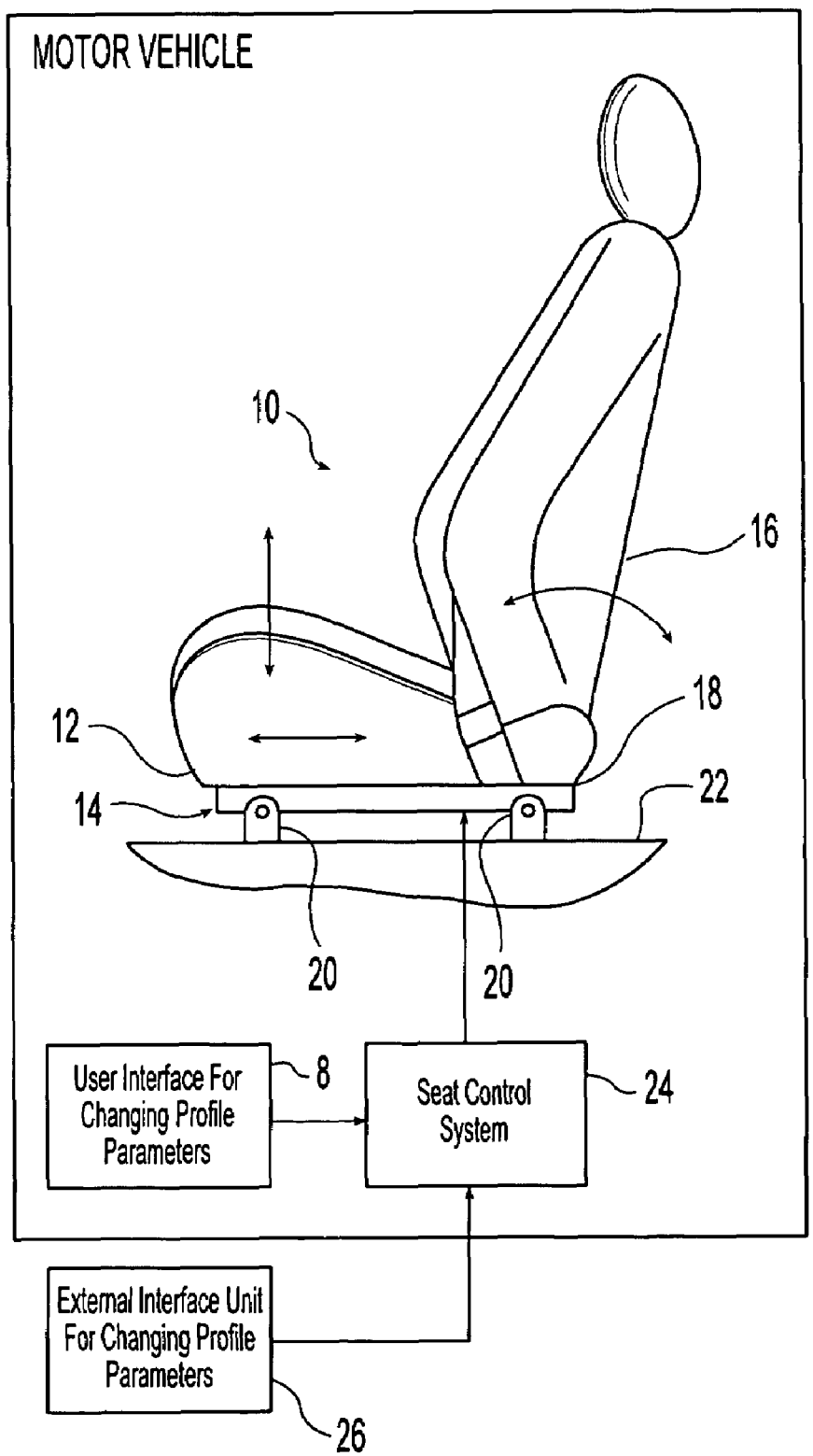
FIG. 14 is a diagrammatic view of a powered seat assembly for a motor vehicle having a customizable motion profile according to the present invention.
Figure 15:
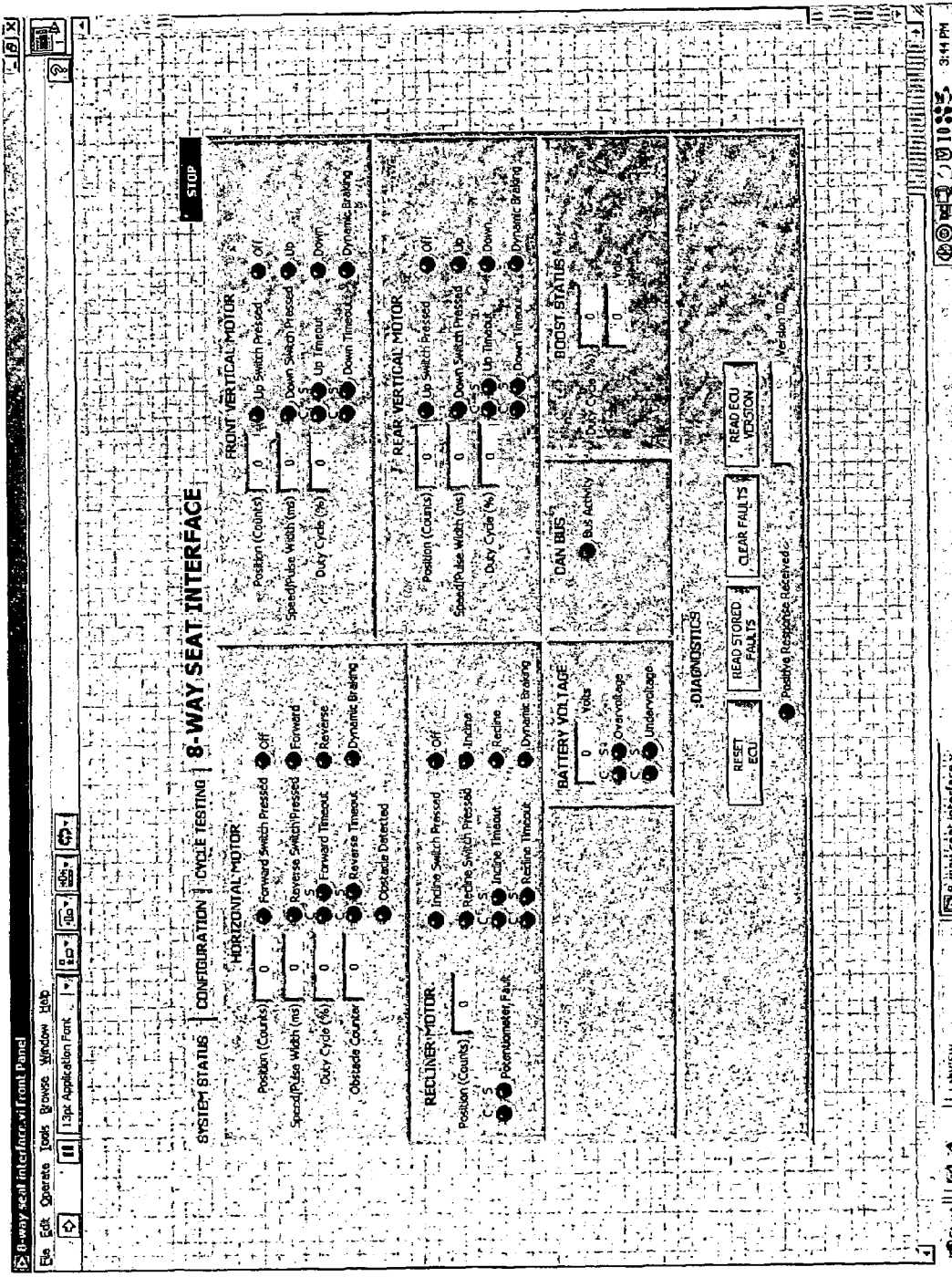
FIG. 15 is a diagrammatic view of a system development tool for the powered seat assembly according to the present invention wherein a systems status screen is shown.
Figure 16:
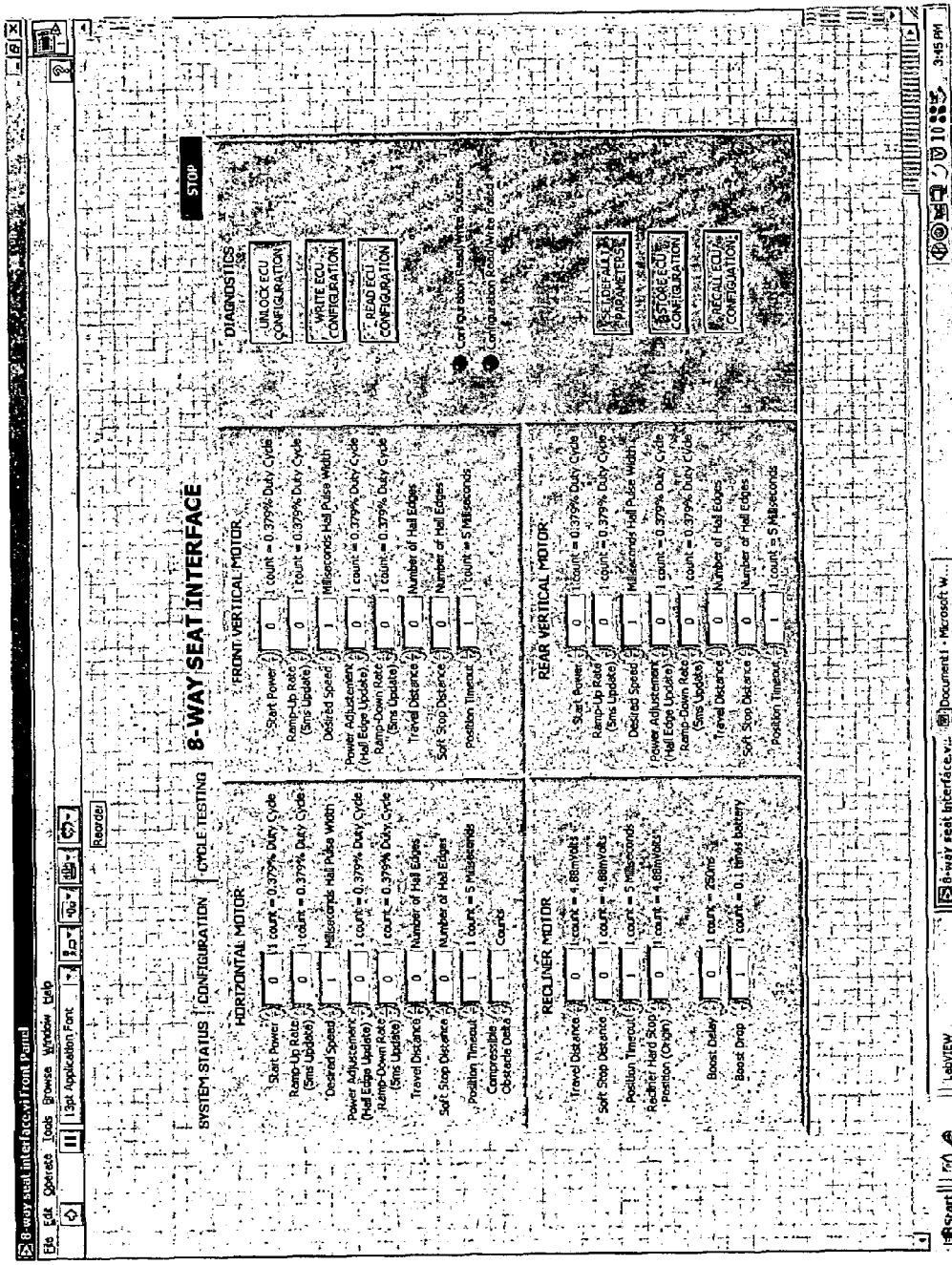
FIG. 16 is a diagrammatic view of a configuration screen of the system development tool of FIG. 15.
Figure 17:
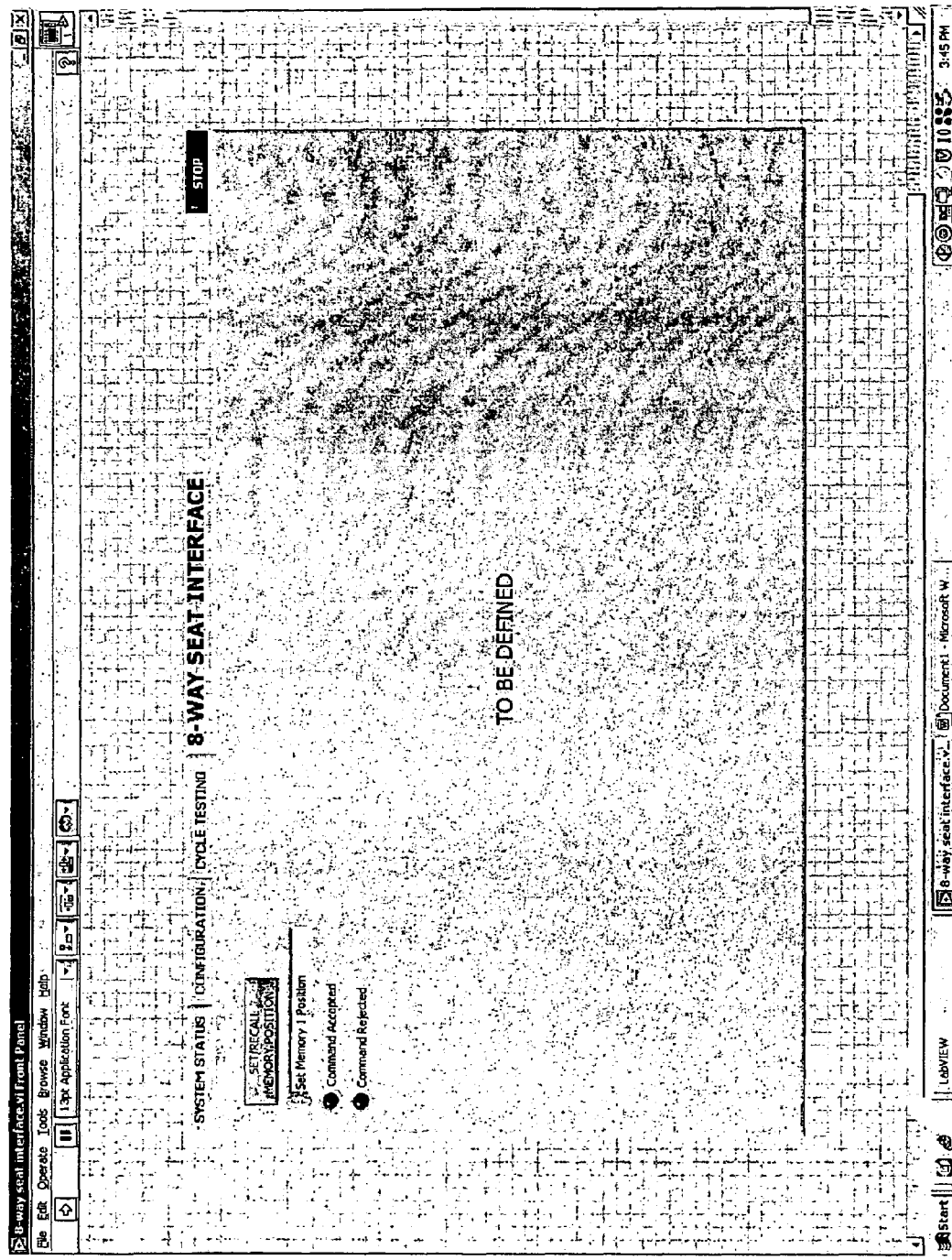
FIG. 17 is a diagrammatic view of a cycle testing screen of the system development tool of FIGS. 15 and 16.

As shown in FIG. 14, the control system or ECU 24 is configurable so that an external interface unit 26 can be utilized to easily set or change any of the above-described parameters controlling the seat motion profile. This configurability enables a single control circuit or ECU 24 to be utilized for multiple seat motion profiles. Therefore, a single seat control system 24 can be utilized in multiple models of motor vehicles and the seat and/or motor vehicle manufacturer can set the parameters so that each vehicle model can have its own desired seat motion profile. As shown in FIGS. 15 to 17, a development tool of the external interface tool 26 enables a developer to load parameters from the seat ECU 24, set parameters as desired, and store the desired parameters in the seat ECU 24. The ECU 24 is configurable that that the developer can easily set parameters by inputting desired values into locations on the development tool screens. The illustrated development tool includes screens for viewing system status, system configuration, and system cycle testing.

Additionally, seat control systems 24 in motor vehicles of the same vehicle can be customized for the vehicle owner by technicians at a motor vehicle dealer or repair shop or by the vehicle owner himself. Moreover, the control system 24 can be configured with an internal user interface 28 so that the vehicle owner can change parameters without the use of the external unit 26. For example, the vehicle owner can use the interface 29 to change, the ramp up rates, the operating speeds, the boost delay time (including turning the boost off), the ramp down rate, and/or other parameters. Also or alternatively, the interface 28 can provide the vehicle owner with the option to select from a plurality of presets or predetermined motion profiles such as, for example, a luxury profile, a normal profile, and a sport profile. It is noted that the user interface can be a vehicle message center having a menu system for configuring other vehicle components.

It is apparent from the above detailed description of preferred embodiments of the present invention, that the electronic control system achieves higher torque and/or speed than normally available from a DC brushed motor without the need for a larger motor, a two speed motor or mechanically using a gear box or clutch. The control system also enables in rush current to the motor to be variable from less than full peak value to greater than 110% of nominal current via control of ramp rates. As a result, smaller, lighter, and/or lower cost motors can be used to obtain at least two speeds.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A motor vehicle seat adjuster comprising, in combination:
    a DC motor;
    a control system operably connected to the motor to control seat motion to a desired profile;
    wherein power to the motor is variable from less than 100% of normal power to greater than 100% of normal power; and
    wherein the desired profile includes an operating speed of about 5 mm/s to about 50 mm/s.

2. The seat adjuster according to claim 1, wherein the desired profile includes a normal operating power and a boost operating power and the control system automatically increases motor power to the boost operating power after one of a predetermined period of time, a predetermined distance of travel, or a predetermined sensed condition.

3. The seat adjuster according to claim 1, wherein the control system has an energy storage device and first and second switches, the energy storage device charges when the first switch is closed and the second switch is opened, and energy stored in the energy storage device is transferred to the motor when the first switch is opened and the second switch is closed to boost at least one of torque output and speed of the motor.

4. The seat adjuster according to claim 3, wherein said energy storage device is a capacitor.

5. The seat adjuster according to claim 3, wherein said first and second switches are each a relay.

6. The seat adjuster according to claim 3, wherein said first and second switches are each a semiconductor device.

7. The seat adjuster according to claim 3, wherein said control system includes a diode and energy stored in the energy storage device is transferred to the motor when the first switch is closed and the second switch is open and a combined potential of the energy storage device and a power supply is greater than a forward bias voltage of the diode.

8. The seat adjuster according to claim 1, wherein the control system selectively boosts at least one of torque output and speed of the motor.

9. The seat adjuster according to claim 1, wherein a boost circuit is operably connected to the motor and has an energy storage device and first and second switches, and wherein the first and second switches are alternately closed to store and discharge energy in the energy storage device to boost at least one of torque output and speed of the motor.

10. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes an activation start time in the range of 10 ms to 500 ms.

11. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a soft start time in the range of about 10 ms to about 500 ms.

12. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a regulation response time of less than or equal to about 250 ms.

13. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a regulation overshoot of less than or equal to +/−25%.

14. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a regulation band less than or equal to +/−10%.

15. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a coast time of less than or equal to about 200 ms.

16. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes position overshoot of less than or equal to about 2 mm displacement.

17. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and wherein the desired profile includes a starting power of about 0% to about 50% normal power.

18. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a ramp up of about 10% to about 10% per 5 ms.

19. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes power adjustment of about 0% to about 10% for speed regulation.

20. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein the desired profile includes a ramp down of about 0% to about 10% per 5 ms.

21. A motor vehicle seat adjuster comprising, in combination:
 a DC motor;
 a control system operably connected to the motor to control seat motion to a desired profile;
 wherein power to the motor is variable from less than 100% of normal power to greater than 100% of normal power; and
 wherein power in the motor is variable from about 0% to near 200% of power available to the motor without the boost circuit.

22. A motor vehicle seat adjuster comprising, in combination:
- a DC motor;
- a control system operably connected to the motor to control seat motion to a desired profile;
- wherein power to the motor is variable from less than 100% of normal cower to greater than 100% of normal power; and
- wherein power in the motor is variable from about 0% to about 180% of power available to the motor without the boost circuit.

23. A motor vehicle seat adjuster comprising, in combination:
- a DC motor;
- a control system operably connected to the motor to control seat motion to a desired profile;
- a user interface for changing the desired profile and operably connected to the control system; and
- wherein parameters of the desired profile are customizable by the vehicle user making selections with the user interface.

24. A motor vehicle seat adjuster comprising, in combination:
- a DC motor;
- a control system operably connected to the motor to control seat motion to a desired profile; and
- wherein the desired profile includes a starting power of about 0% to about 50% full power, a normal operating power of about 90% to about 100% of full power, and a boost operating power of at least about 180% of full power.

25. The seat adjuster according to claim 24, wherein the control system automatically increases motor power to the boost operating power after one of a predetermined period of time, a predetermined distance of travel, or a predetermined sensed condition.

26. The seat adjuster according to claim 24, wherein the desired profile includes an activation start time in the range of 10 ms to 500 ms.

27. The seat adjuster according to claim 24, wherein the desired profile includes a soft start time in the range of about 10 ms to about 500 ms.

28. The seat adjuster according to claim 24, wherein the desired profile includes a regulation response time of less than or equal to about 250 ms.

29. The seat adjuster according to claim 24, wherein the desired profile includes a regulation overshoot of less than or equal to +/−25%.

30. The seat adjuster according to claim 24, wherein the desired profile includes a regulation band less than or equal to +/−10%.

31. The seat adjuster according to claim 24, wherein the desired profile includes a coast time of less than or equal to about 200 ms.

32. The seat adjuster according to claim 24, wherein the desired profile includes position overshoot of less than or equal to about 2 mm displacement.

33. The seat adjuster according to claim 24, wherein the desired profile includes a ramp up of about 0% to about 10% per 5 ms.

34. The seat adjuster according to claim 24, wherein the desired profile includes power adjustment of about 0% to about 10% for speed regulation.

35. The seat adjuster according to claim 24, wherein the desired profile includes an operating speed of about 5 mm/s to about 50 mm/s.

36. The seat adjuster according to claim 24, wherein the desired profile includes a ramp down of about 0% to about 10% per 5 ms.

37. A motor vehicle seat adjuster comprising, in combination:
- a DC motor;
- a control system operably connected to the motor to control seat motion to a desired profile;
- wherein the desired profile includes a starting power of about 0% to about 50% full power, a normal operating power of about 90% to about 100% of full power, and a boost operating power of at least about 180% of full power;
- wherein the desired profile includes an activation start time in the range of 10 ms to 500 ms
- wherein the desired profile includes a soft start time in the range of about 10 ms to about 500 ms;
- wherein the desired profile includes a ramp up of about 0% to about 10% per 5 ms.
- wherein the desired profile includes a regulation response time of less than or equal to about 250 ms;
- wherein the desired profile includes a regulation overshoot of less than or equal to +/−25%;
- wherein the desired profile includes a regulation band less than or equal to +/−10%
- wherein the desired profile includes a coast time of less than or equal to about 200 ms;
- wherein the desired profile includes position overshoot of less than or equal to about 2 mm displacement; and
- wherein the desired profile includes a ramp down of about 0% to about 10% per 5 ms.
- wherein the desired profile includes a normal operating speed of about 5 mm/s to about 50 mm/s.

38. A motor vehicle seat adjuster comprising, in combination:
- a DC motor;
- a control system operably connected to the motor to control seat motion to a desired profile;
- wherein the desired profile includes an activation start time in the range of 10 ms to about 500 ms;
- wherein the desired profile includes a soft start time in the range of about 10 ms to about 500 ms;
- wherein the desired profile includes a ramp up of about 0% to about 10% per 5 ms.
- wherein the desired profile includes a regulation response time of less than or equal to about 250 ms;
- wherein the desired profile includes a regulation overshoot of less than or equal to +/−25%;
- wherein the desired profile includes a regulation band less than or equal to +/−10%;
- wherein the desired profile includes a coast time of less than or equal to about 200 ms;
- wherein the desired profile includes position overshoot of less than or equal to about 2 mm displacement; and
- wherein the desired profile includes a ramp down of about 0% to about 10% per 5 ms.
- wherein the desired profile includes a normal operating speed of about 5 mm/s to about 50 mm/s.

* * * * *